US008797892B2

(12) United States Patent
Chin et al.

(10) Patent No.: US 8,797,892 B2
(45) Date of Patent: Aug. 5, 2014

(54) METHODS AND SYSTEMS FOR POWER SAVINGS IN FDD OR H-FDD NETWORKS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1073 days.

(21) Appl. No.: 12/776,334

(22) Filed: May 7, 2010

(65) Prior Publication Data

US 2010/0290373 A1 Nov. 18, 2010

Related U.S. Application Data

(60) Provisional application No. 61/178,947, filed on May 16, 2009.

(51) Int. Cl.
*H04L 12/28* (2006.01)
(52) U.S. Cl.
USPC ........................................... 370/252; 370/254

(58) Field of Classification Search
USPC .......... 370/252, 254, 280, 281, 311; 455/458, 455/522
See application file for complete search history.

(56) References Cited

U.S. PATENT DOCUMENTS

2006/0009242 A1* 1/2006 Ryu et al. ...................... 455/458
2007/0270118 A1* 11/2007 Subramanian et al. ..... 455/343.2
2007/0286157 A1 12/2007 Shaikh et al.
2009/0268641 A1* 10/2009 Yim et al. ...................... 370/277

OTHER PUBLICATIONS

Taiwan Search Report—TW099115528—TIPO—Jul. 30, 2013.

* cited by examiner

*Primary Examiner* — Yemane Mesfin
*Assistant Examiner* — Mon Cheri Davenport
(74) *Attorney, Agent, or Firm* — Tyler J. Overall

(57) ABSTRACT

Certain embodiments of the present disclosure provide methods and systems for saving battery power in frequency division duplex (FDD) or half-duplex FDD (H-FDD) wireless networks.

36 Claims, 11 Drawing Sheets

| Field | Size | Description | Comments |
|---|---|---|---|
| Management Message Type | 8 bits | Management Message Type = 55 for DREG-REQ | Existing Field |
| .... | .... | .... | .... |
| .... | .... | .... | .... |
| H-FDD Group Monitoring | 8 bits | 0 - H-FDD group 1<br>1 - H-FDD group 2<br>2 - Both H-FDD groups<br>3-255 - Reserved | New TLV is proposed for monitoring the H-FDD Group(s) in Page Listening Interval. |

FIG. 8

| Field | Size | Description | Comments |
|---|---|---|---|
| Management Message Type | 8 bits | Management Message Type = 49 for DREG-CMD | Existing Field |
| …. | …. | …. | …. |
| …. | …. | …. | …. |
| H-FDD Group Monitoring | 8 bits | 0 - H-FDD group 1<br>1 - H-FDD group 2<br>2 - Both H-FDD groups<br>3-255 - Reserved | New TLV is proposed for monitoring the H-FDD Group in Page Listening Interval. |

FIG. 9

METHODS AND SYSTEMS FOR POWER SAVINGS IN FDD OR H-FDD NETWORKS

CLAIM OF PRIORITY

This application for patent claims the benefit of priority from U.S. Provisional Patent Application Ser. No. 61/178,947, entitled "Methods and Systems for Power Savings in Frequency Division Duplex (FDD) or Half Duplex FDD WIMAX Networks" and filed May 16, 2009, which is assigned to the assignee of this application and is fully incorporated herein by reference for all purposes.

TECHNICAL FIELD

Certain embodiments of the present disclosure generally relate to wireless communication and, more particularly, to methods and systems for saving battery power in frequency division duplex (FDD) or half-duplex FDD (H-FDD) networks.

SUMMARY

Certain embodiments of the present disclosure provide a method for wireless communications by a mobile station (MS). The method generally includes transmitting a request message to a base station (BS) to notify the BS of the MS entering the idle mode, wherein the message includes an indication of a first frequency division duplex (FDD) group, receiving a command message from the BS, wherein the command message includes an indication of a second FDD group, monitoring paging messages during a time interval of the second FDD group and powering down during a time interval of the first FDD group, and receiving a paging advertisement message in the second FDD group and sending a reply to the paging advertisement message to the base station in an uplink subframe of the second FDD group.

Certain embodiments of the present disclosure provide an apparatus for wireless communications by a mobile station (MS). The apparatus generally includes logic for transmitting a request message to a base station (BS) to notify the BS of the MS entering the idle mode, wherein the message includes an indication of a first frequency division duplex (FDD) group, logic for receiving a command message from the BS, wherein the command message includes an indication of a second FDD group, logic for monitoring paging messages during a time interval of the second FDD group and powering down during a time interval of the first FDD group, and logic for receiving a paging advertisement message in the second FDD group and sending a reply to the paging advertisement message to the base station in an uplink subframe of the second FDD group.

Certain embodiments of the present disclosure provide an apparatus for wireless communications by a mobile station (MS). The apparatus generally includes means for transmitting a request message to a base station (BS) to notify the BS of the MS entering the idle mode, wherein the message includes an indication of a first frequency division duplex (FDD) group, means for receiving a command message from the BS, wherein the command message includes an indication of a second FDD group, means for monitoring paging messages during a time interval of the second FDD group and powering down during a time interval of the first FDD group, and means for receiving a paging advertisement message in the second FDD group and sending a reply to the paging advertisement message to the base station in an uplink subframe of the second FDD group.

Certain embodiments of the present disclosure provide a computer-program storage apparatus for wireless communication by a mobile station (MS), comprising a memory device having instructions stored thereon, the instructions being executable by one or more processors. The instructions generally include instructions for transmitting a request message to a base station (BS) to notify the BS of the MS entering the idle mode, wherein the message includes an indication of a first frequency division duplex (FDD) group, instructions for receiving a command message from the BS, wherein the command message includes an indication of a second FDD group, instructions for monitoring paging messages during a time interval of the second FDD group and powering down during a time interval of the first FDD group, and instructions for receiving a paging advertisement message in the second FDD group and sending a reply to the paging advertisement message to the base station in an uplink subframe of the second FDD group.

Certain embodiments of the present disclosure provide a method for wireless communications by a base station (BS). The method generally includes receiving a request message from a mobile station (MS), wherein the request message includes an indication of a first frequency division duplex (FDD) group, transmitting a command message to the MS, wherein the command message includes an indication of a second FDD group, broadcasting a paging advertisement message in the second FDD group, and receiving a reply to the paging advertisement message in an uplink subframe of the second FDD group from the mobile station.

Certain embodiments of the present disclosure provide an apparatus for wireless communications by a base station (BS). The apparatus generally includes logic for receiving a request message from a mobile station (MS), wherein the request message includes an indication of a first frequency division duplex (FDD) group, logic for transmitting a command message to the MS, wherein the command message includes an indication of a second FDD group, logic for broadcasting a paging advertisement message in the second FDD group, and logic for receiving a reply to the paging advertisement message in an uplink subframe of the second FDD group from the mobile station.

Certain embodiments of the present disclosure provide an apparatus for wireless communications by a base station (BS). The apparatus generally includes means for receiving a request message from a mobile station (MS), wherein the request message includes an indication of a first frequency division duplex (FDD) group, means for transmitting a command message to the MS, wherein the command message includes an indication of a second FDD group, means for broadcasting a paging advertisement message in the second FDD group, and means for receiving a reply to the paging advertisement message in an uplink subframe of the second FDD group from the mobile station.

Certain embodiments of the present disclosure provide a computer-program storage apparatus for wireless communication by a base station (BS), comprising a memory device having instructions stored thereon, the instructions being executable by one or more processors. The instructions generally include instructions for receiving a request message from a mobile station (MS), wherein the request message includes an indication of a first frequency division duplex (FDD) group, instructions for transmitting a command message to the MS, wherein the command message includes an indication of a second FDD group, instructions for broadcasting a paging advertisement message in the second FDD group, and instructions for receiving a reply to the paging advertisement message in an uplink subframe of the second FDD group from the mobile station.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 8 illustrates an example table containing the current and proposed fields in a DREG-REQ message, in accordance with certain embodiments of the present disclosure.

FIG. 9 illustrates an example table containing the current and proposed fields in a DREG-CMD message, in accordance with certain embodiments of the present disclosure.

DETAILED DESCRIPTION

Figure 1:
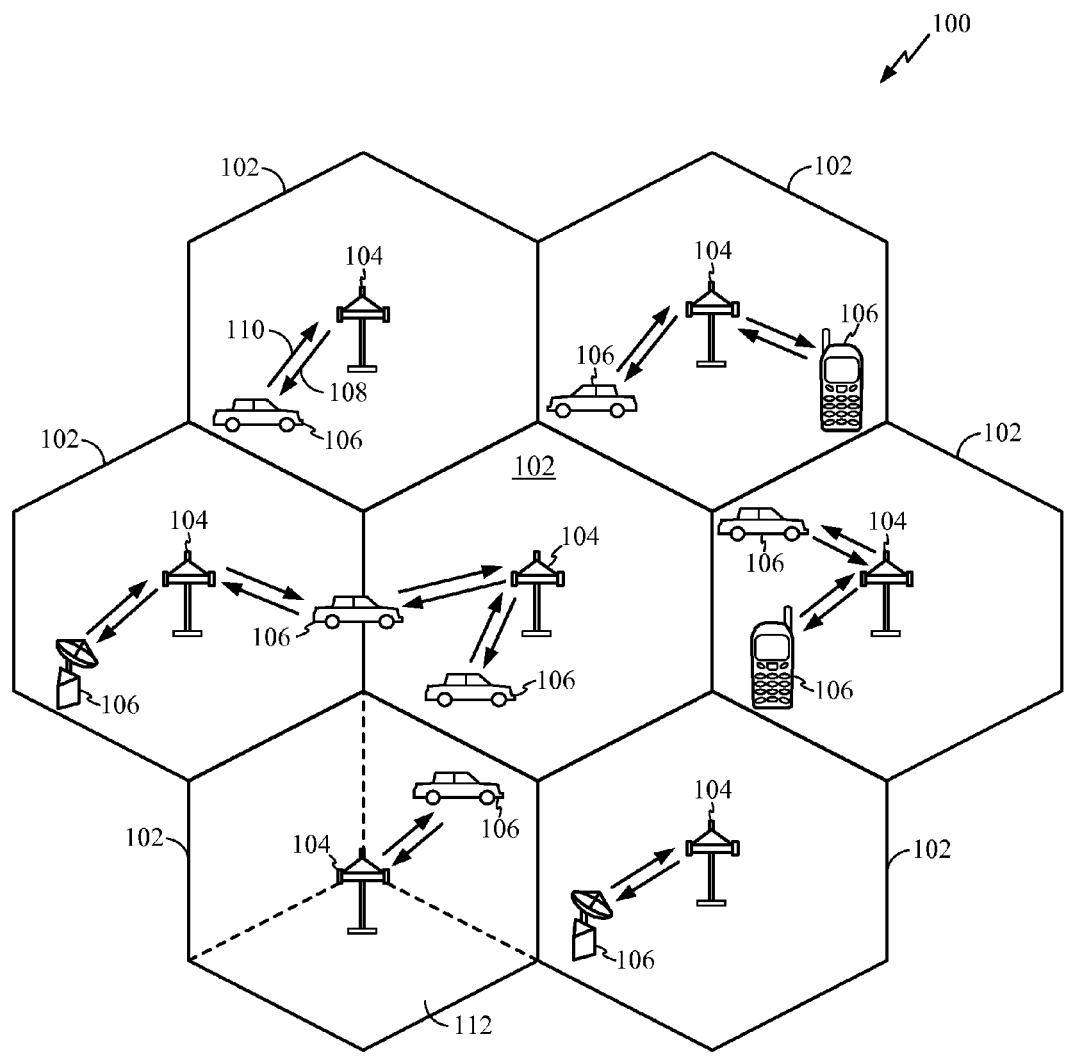
FIG. 1 illustrates an example wireless communication system, in accordance with certain embodiments of the present disclosure.

Certain embodiments provide a method for wireless communications by a mobile station (MS). The method generally includes transmitting a request message to a base station (BS) to notify the BS of the MS entering the idle mode, wherein the message includes an indication of a first frequency division duplex (FDD) group, receiving a command message from the BS, wherein the command message includes an indication of a second FDD group, monitoring paging messages during a time interval of the second FDD group and powering down during a time interval of the first FDD group, and receiving a paging advertisement message in the second FDD group and sending a reply to the paging advertisement message to the base station in an uplink subframe of the second FDD group.

Certain embodiments provide a method for wireless communications by a base station (BS). The method generally includes receiving a request message from a mobile station (MS), wherein the request message includes an indication of a first frequency division duplex (FDD) group, transmitting a command message to the MS, wherein the command message includes an indication of a second FDD group, broadcasting a paging advertisement message in the second FDD group, and receiving a reply to the paging advertisement message in an uplink subframe of the second FDD group from the mobile station.

WiMAX standards provide the idle more features to allow the mobile station (MS) to power down hardware during the page unavailable interval while staying awake to listen to the page advertisement broadcast (MOB_PAG-ADV) message during the page listening interval. However, standards do not clearly specify the behavior for full-duplex frequency division duplex (FDD) or half-duplex FDD (H-FDD) capable MSs in paging listening interval.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system that uses orthogonal multiplexing schemes is a 3rd Generation Partnership Project (3GPP) Long Term Evolution (LTE) system. For downlink, LTE uses OFDM, and for uplink, LTE uses SC-FDMA. LTE also supports FDD, which may utilize certain embodiments of the present disclosure.

Another example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These tw standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
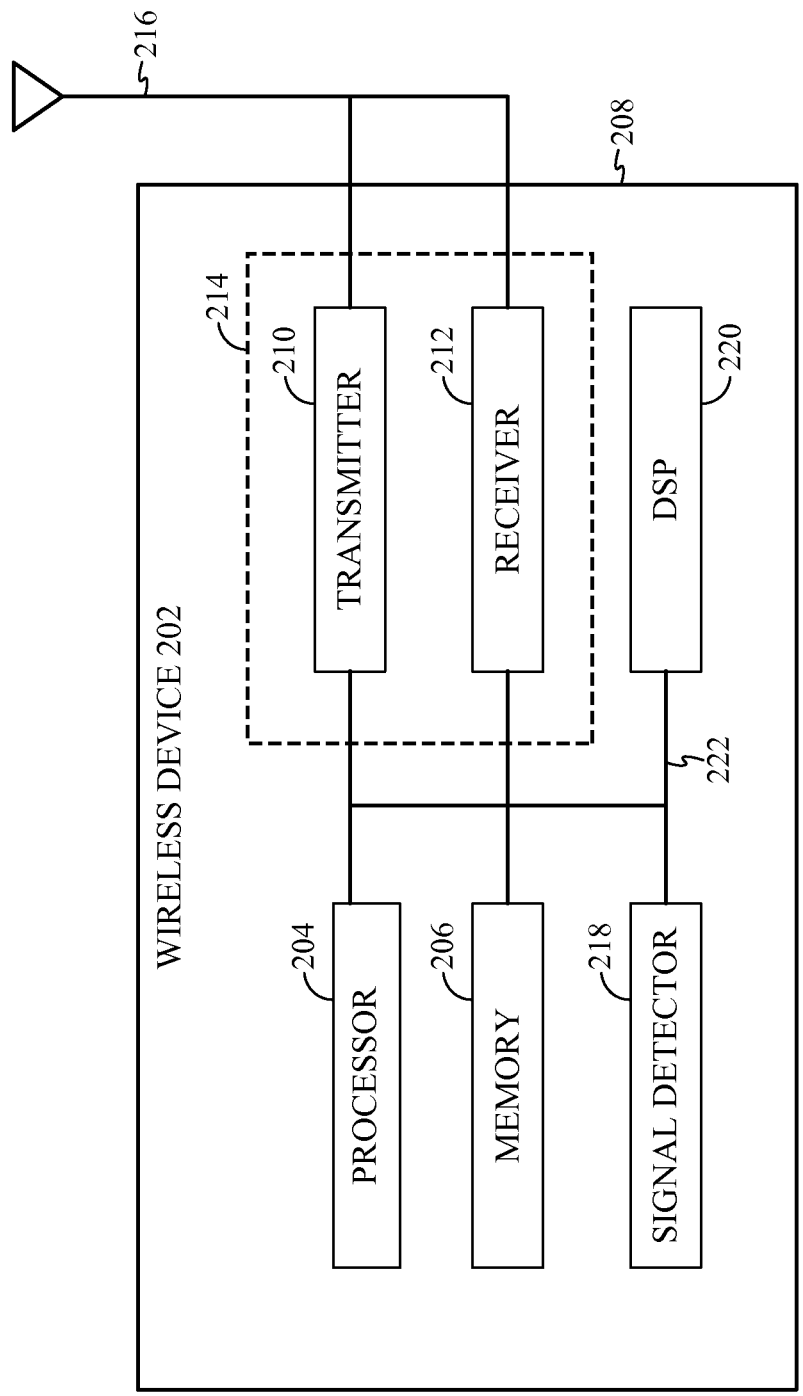
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
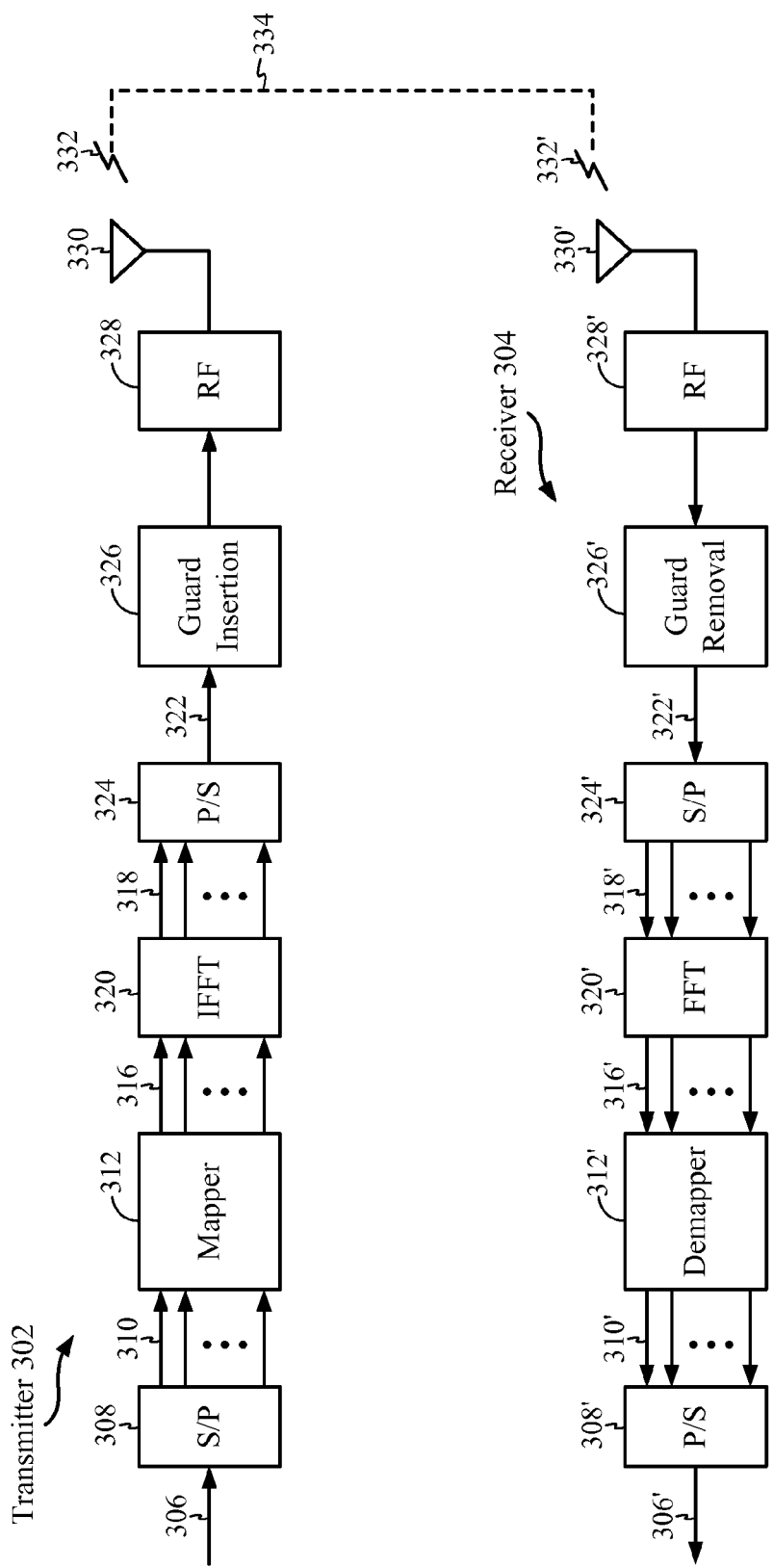
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Battery Power Savings in FDD or H-FDD Networks

WiMAX standards provide the idle more features to allow the mobile station (MS) to power down hardware during the page unavailable interval while staying awake to listen to the page advertisement broadcast (MOB_PAG-ADV) message during the page listening interval.

Figure 4:
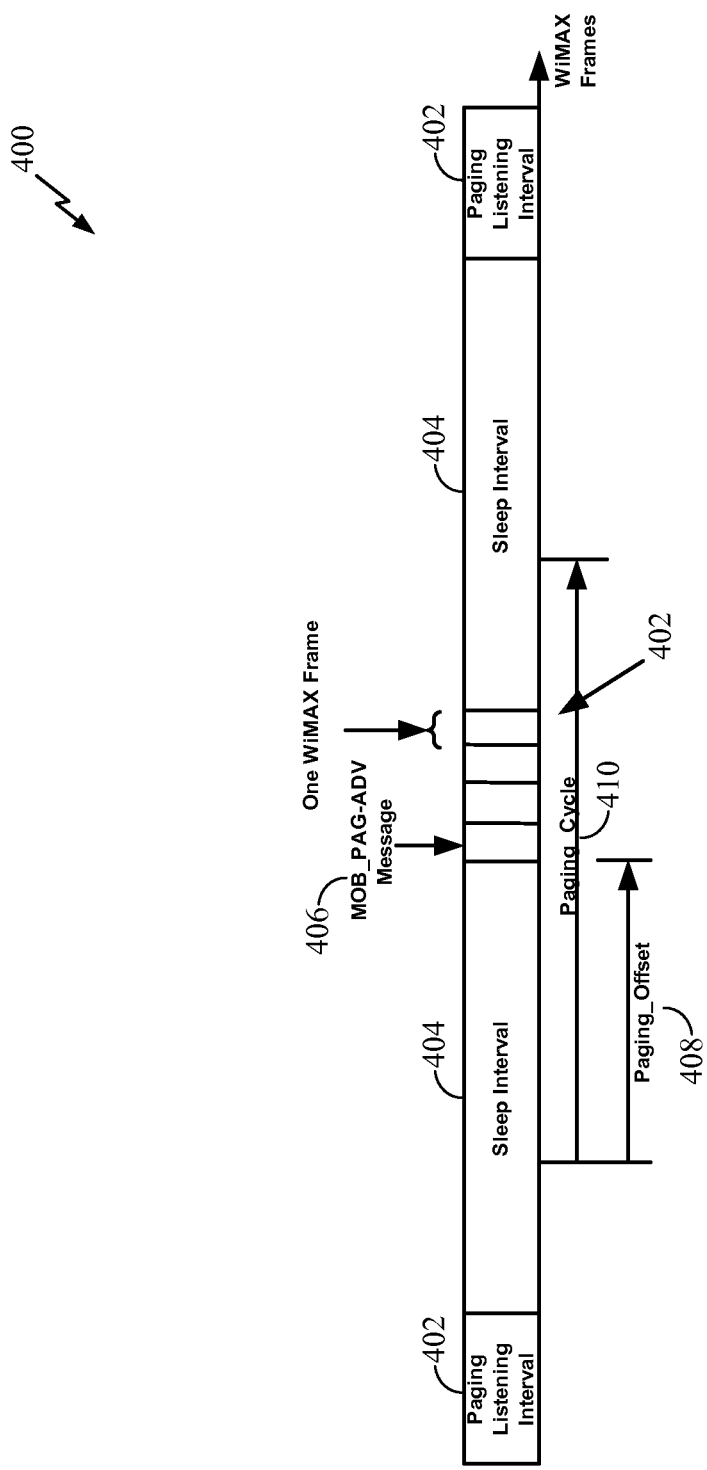
FIG. 4 illustrates an example of sleep/listen intervals for a mobile station during idle mode in the Worldwide Interoperability for Microwave Access (WiMAX) standard.

FIG. 4 illustrates an example of the sleep 404 listen 402 intervals for a mobile station during idle mode in WiMAX standard. The MS may exchange DREG-REQ/CMD messages with the base station (BS) in order to enter the idle mode. While in idle mode, MS will listen to the page messages in certain recurring time intervals 402. The MS starts to listen to the page advertisement message (MOB_PAG-ADV) 406 from frame number N when the following equation satisfies:

N mod Paging_Cycle=Paging_Offset in which Paging_Cycle 410 Paging_Offset 408 are known parameters. The MS continues to listen to the page messages for a number of frames equal to the length of Paging_Listening_Interval 402 from frame number N.

Figure 5:
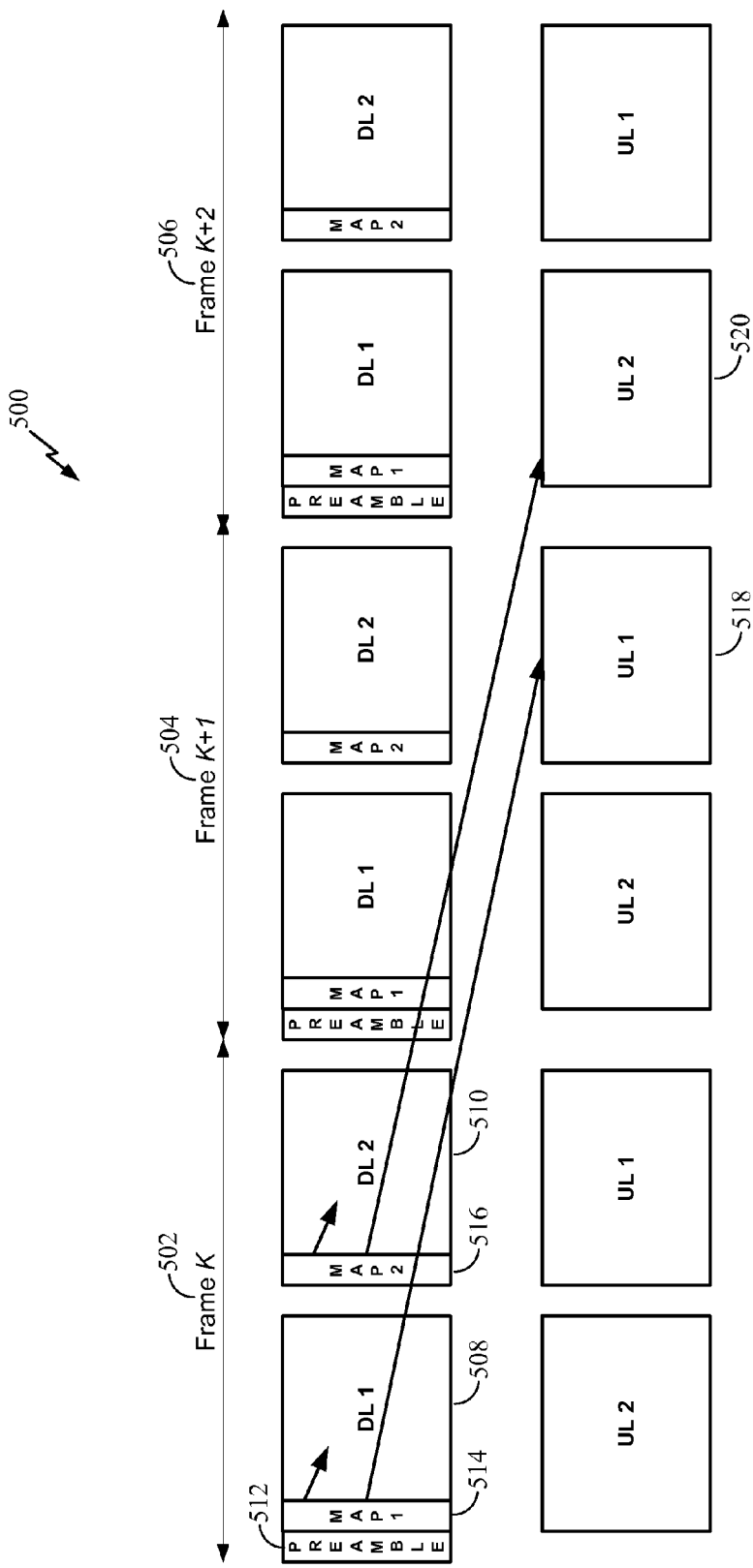
FIG. 5 illustrates an example frame structure in frequency division duplex (FDD) mode in WiMAX standard.

The WiMAX standard provides FDD (Frequency Division Duplex) in addition to the TDD (Time Division Duplex) operation of mobile stations. FIG. 5 illustrates a frame structure for FDD operation. The downlink (DL) and uplink (UL) may operate on different frequencies. Each DL part of the frame is divided into two groups, in which group 1 leads group 2. Each UL part of the frame is divided into two groups, in which group 2 leads group 1. The first DL subframe includes preamble 512, FCH1 (Frame Control Header 1), DL MAP1, UL MAP2, DCD (Downlink Channel Descriptor) and UCD (Uplink Channel Descriptor) messages. The second DL subframe includes FCH2 (Frame Control Header 2), DL MAP2, UL MAP2, DCD and UCD messages.

Each group of resources may be allocated independently. The DL MAP1 514 of frame K 502 allocates the data bursts of the first DL subframe 508 of frame K 502 and UL MAP1 of frame K 502 allocates the data bursts of the second UL subframe 518 of frame K+1 504. The DL MAP2 516 of frame K 502 allocates the data bursts of the second DL subframe 510 of frame K and UL MAP2 of frame K allocates the data bursts of the first UL subframe 520 of frame K+2 506. DCD and UCD of these two groups are the same.

A mobile station (MS) may have one of the two possible capabilities: H-FDD (Half-Duplex Frequency Division Duplex) or FDD (Full-Duplex Frequency Division Duplex). In the FDD mode, an MS can transmit and receive in both of the two groups. In H-FDD mode, an MS can transmit and receive in only one of two H-FDD groups. The base station may always operate in FDD.

However, current standards do not clearly specify the behavior for FDD/H-FDD capable MS in paging listening interval.

Certain embodiments of the present disclosure provide solutions to define the idle mode operation of the FDD/H-FDD capable MS in paging listening interval. In addition, some techniques are proposed to save more power for the FDD/H-FDD MS in idle mode.

Figure 6:
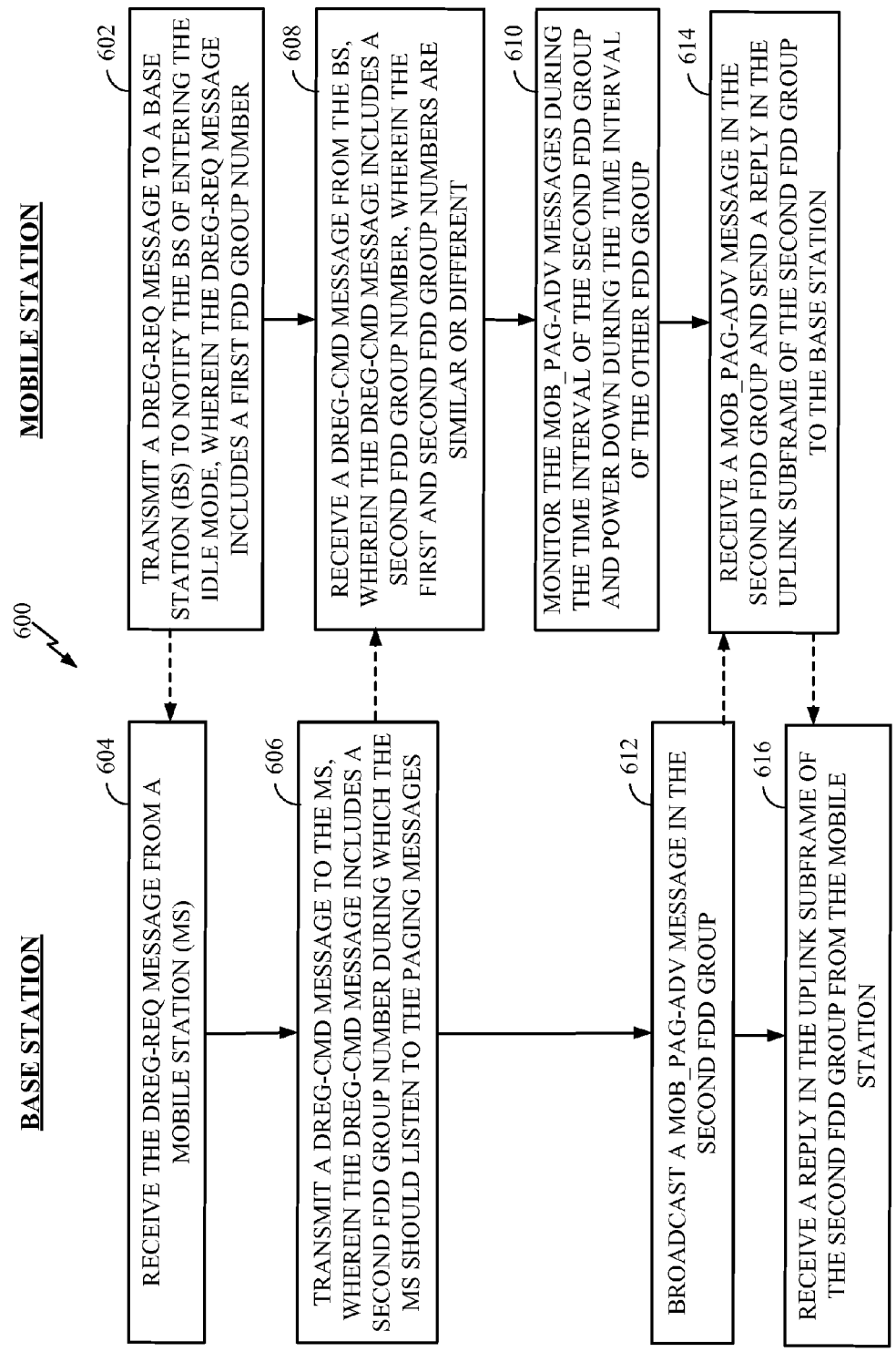
FIG. 6 illustrates example operations for saving battery power in frequency division duplex (FDD) or half-duplex FDD WiMAX mobile station, in accordance with certain embodiments of the present disclosure.

FIG. 6 illustrates example operations for saving battery power in frequency division duplex (FDD) or half-duplex FDD WiMAX mobile station, in accordance with certain embodiments of the present disclosure. At 602, a mobile station transmits a DREG-REQ message to a base station to notify the BS of entering the idle mode; wherein the DREG-REQ message includes a first FDD group number. At 604, the BS receives the DREG-REQ message from the mobile station. At 606, the BS transmits a DREG-CMD message to the MS, wherein the DREG-CMD message includes a second FDD group number during which the MS should listen to the paging messages. The first FDD group and the second FDD group may be similar or different. At 608, the MS receives a DREG-CMD message from the BS, wherein the DREG-CMD message includes the second FDD group number.

At 610, the MS monitors the MOB_PAG-ADV messages during the time interval of the second FDD group and powers down during the time interval of the other FDD group. At 612, the BS broadcasts a MOB_PAG-ADV message in the second FDD group. At 614, the MS receives a MOB_PAG-ADV message in the second FDD group and sends a reply in the uplink subframe of the same FDD group to the base station. At 616, the base station receives a reply to the MOB_PAG-ADV message in the uplink subframe of the same FDD group from the mobile station.

For certain embodiments of the present disclosure, a BS may send a broadcast MOB_PAG-ADV message in one of the following ways in order to gain flexibility. 1) The specific DL subframe of the H-FDD group that the H-FDD MS is currently in. 2) Both DL subframes for the H-FDD MS (to be used as a failure recovery mechanism). 3) Any of two DL subframe for the FDD MS (by considering balanced load). 4) Both of the DL subframes of the FDD MS (to be used as a failure recovery mechanism)

Figure 7:
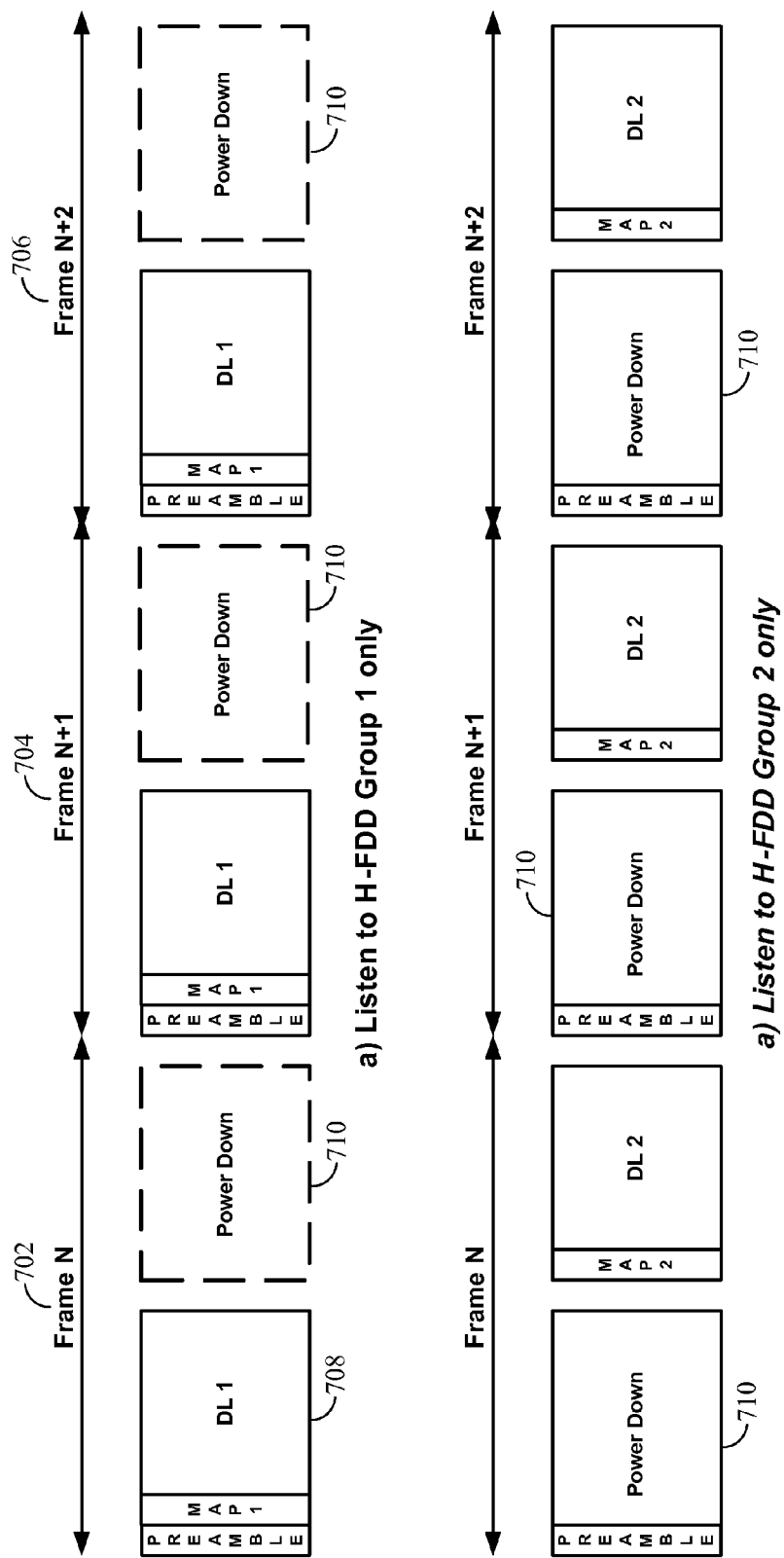
FIG. 7 illustrates an example power saving technique for a mobile station, in accordance with certain embodiments of the present disclosure.

For certain embodiments of the present disclosure, a power saving enhancement technique may be used, as illustrated in FIG. 7. In one embodiment, a H-FDD MS may stay awake in the DL subframe of the H-FDD group 708 and power down in the other DL subframe 710 of frames N 702, N+1 704 and N+2 706, etc. For another embodiment, an FDD MS may request to switch down to listen to the page message in a specific H-FDD group 708, so that the MS stays awake in the DL subframe of the H-FDD group 708 and powers down in the other DL subframe 710.

For certain embodiments of the present disclosure, an MS and a BS may monitor certain H-FDD groups. The DREG-REQ message may be modified as illustrated in the table in FIG. 8 to enable the FDD/H-FDD MS to request a specific H-FDD group to monitor the MOB_PAG-ADV messages.

In order for BS to command the H-FDD group(s) for monitoring the MOB_PAG-ADV messages, the DREG-CMD message may be modified as illustrated in the table in FIG. 9. It should be noted that the new TLV can be a confirmation to the proposed H-FDD Group Monitoring TLV in DREG-REQ message. Alternatively, if the BS does not agree with the H-FDD group proposed by an MS, e.g., due to load balancing consideration, the BS may command the MS to monitor the other H-FDD.

For some embodiments of the present disclosure, the FDD MS may remain active and listen to both H-FDD groups by setting the value 2 in the TLV. For another embodiment, the BS may ask a FDD MS to listen to both H-FDD groups to gain flexibility in sending page messages to achieve better load balancing.

For certain embodiments of the present disclosure, a BS transmits a MOB_PAG-ADV message and monitors the channel for a response from a mobile station. The BS may broadcast MOB_PAG-ADV to the specific H-FDD group as specified by DREG-REQ/CMD and also to one of the two H-FDD groups for the FDD MS who will listen to both H-FDD groups as specified by DREG-REQ/CMD, after considering the loading.

For certain embodiments of the present disclosure, if the H-FDD Group Monitoring TLV is not included in DREG-REQ/CMD, the network shall broadcast MOB_PAG-ADV to the specific H-FDD group where the H-FDD MS used to be in normal mode, and one of the two H-FDD groups for the FDD MS, after considering the loading. Accordingly, an MS may reply to MOB_PAG-ADV message in the UL subframe of the same H-FDD group similar to the one in which MS has received the MOB_PAG-ADV message.

Certain embodiments of the present disclosure propose a method for failure recovery of page messages. A BS may broadcast to an H-FDD group which MS cannot receive the MOB_PAG-ADV message from. For example, the H-FDD group may have more interference and cause higher message error rate. Another condition is that the network loses the information of which H-FDD group information to where MS belongs. For certain embodiments of the present disclosure, the network may first broadcast the MOB_PAG-ADV message to one of the H-FDD groups. If MOB_PAG-ADV messaging fails for a few times (i.e., no response from MS), the network can broadcast the MOB_PAG-ADV message to both H-FDD groups.

Figure 10:
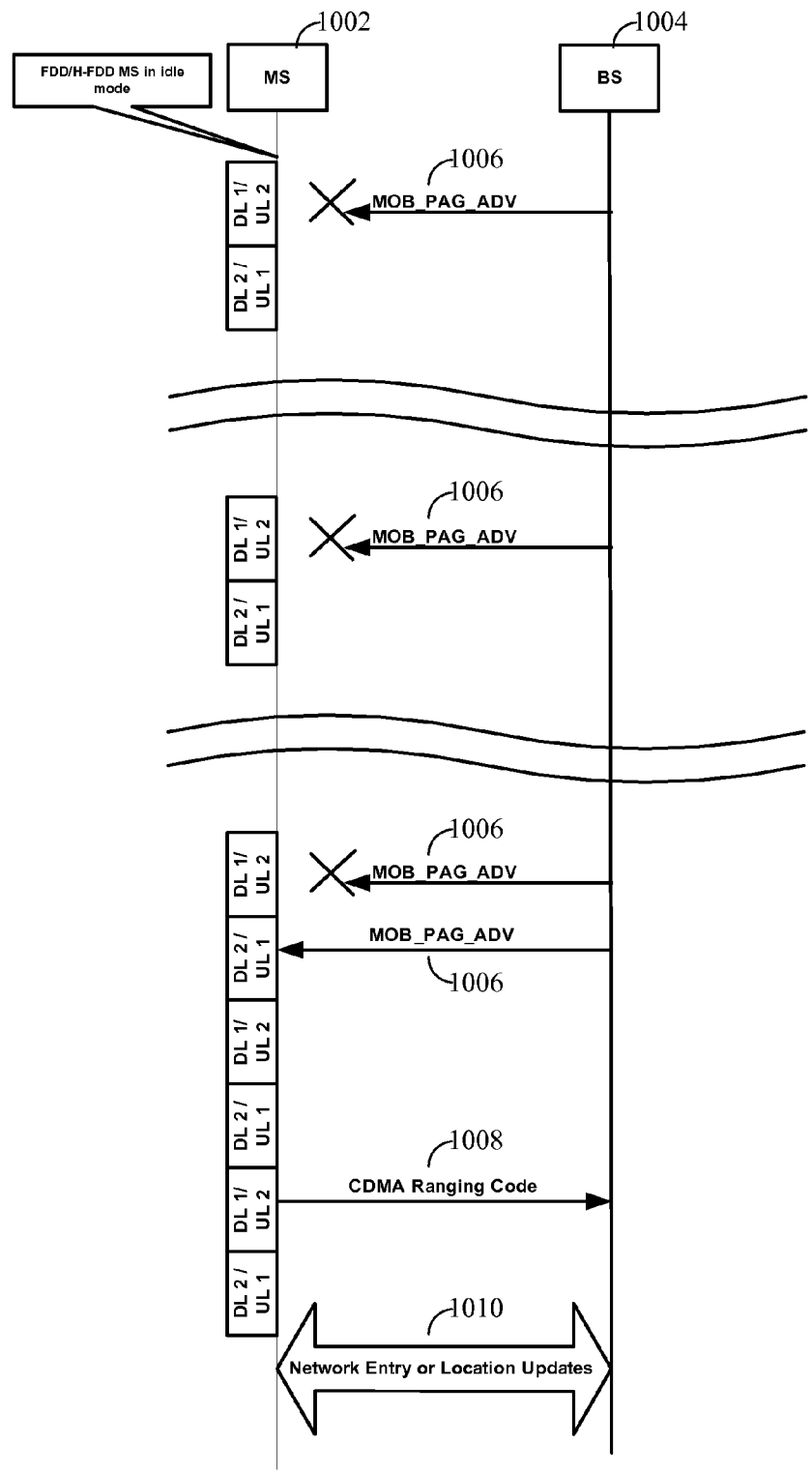
FIG. 10 illustrates an example procedure for failure recovery of page messages, in accordance with certain embodiments of the present disclosure.

FIG. 10 illustrates example communications between a BS 1004 and an MS 1002 in channel error condition. In this figure, the MS may not receive the MOB_PAG-ADV message 1006 for the first few attempts in FDD group 1, but receives the message when the base station switches to the FDD group 2. The MS 1002 receives a MOB_PAG-ADV message 1006 in DL subframe of H-FDD group 2, and sends the CDMA ranging code 1008 and the rest of the messages for the network entry or location update 1010 in the UL subframe of the same H-FDD group (i.e., group 2).

The current disclosure proposes a technique to monitor MOB_PAG-ADV messages in one of the two DL subframes in FDD/H-FDD mode to save power. As a result, a mobile station operating in idle mode can save up to half of its power compared to the conventional idle mode operations.

Figure 6A:
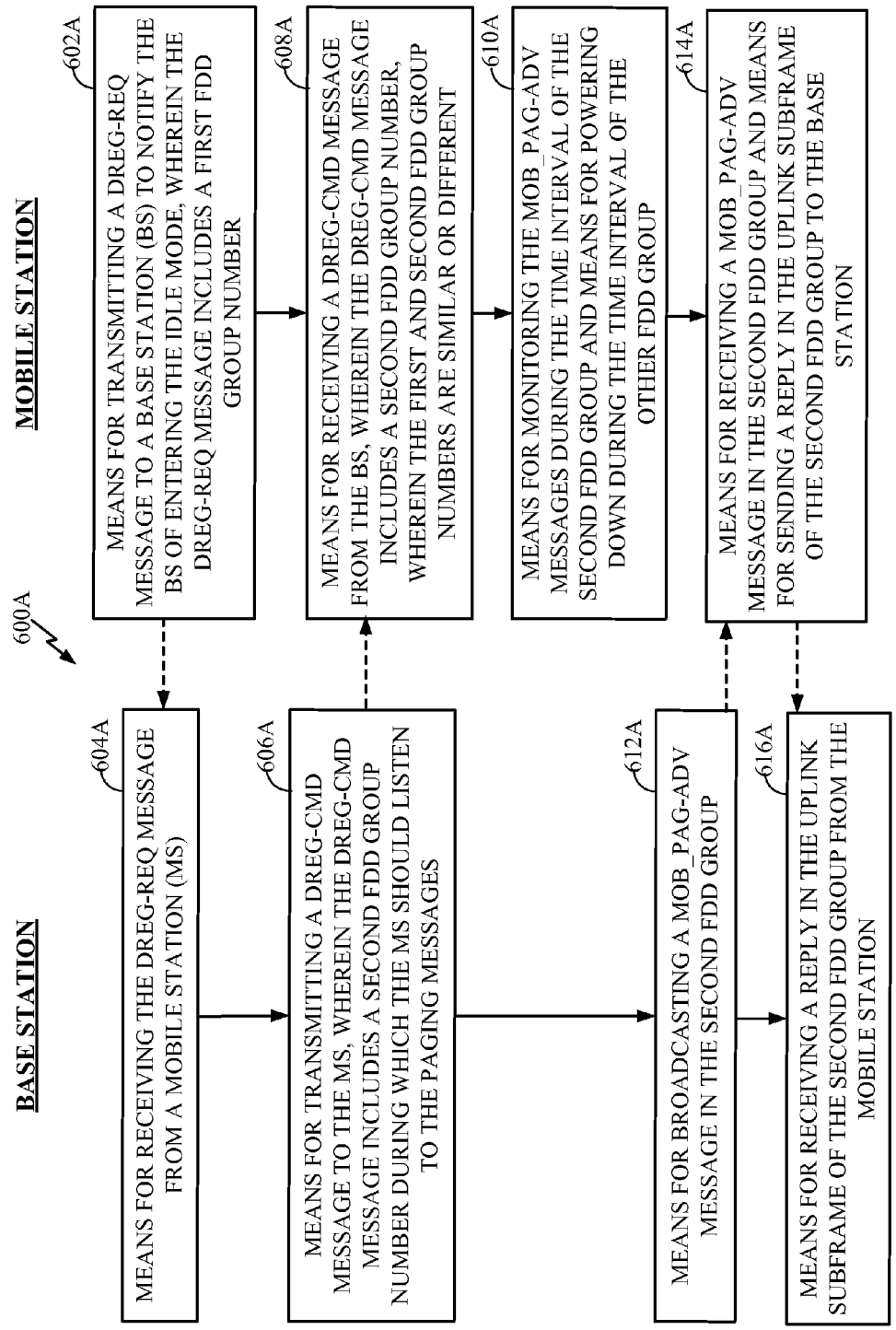
FIG. 6A illustrates example components capable of performing the operations shown in FIG. 6.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 602-616 illustrated in FIG. 6 correspond to means-plus-function blocks 602A-616A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions one or more memory devices or computer-readable media. A storage media or memory devices may be any available media that can be accessed by a computer and/or executable by one or more processors, whether on-chip or off-chip memory. By way of example, and not limitation, such computer-readable media or storage devices can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a mobile station (MS), comprising:
    transmitting a request message to a base station (BS) to notify the BS of the MS entering the idle mode, wherein the message includes an indication of a first frequency division duplex (FDD) group of the BS;
    receiving a command message from the BS, wherein the command message includes an indication of a second FDD group of the BS;
    monitoring paging messages during a time interval of the second FDD group and powering down during a time interval of the first FDD group; and
    receiving a paging advertisement message in the second FDD group and sending a reply to the paging advertisement message to the base station in an uplink subframe of the second FDD group.

2. The method of claim 1, wherein the mobile station is capable of full-duplex FDD communication.

3. The method of claim 1, wherein the mobile station is capable of half-duplex FDD communication.

4. The method of claim 1, wherein the command message includes indications of both the first and the second FDD groups.

5. The method of claim 1, wherein:
    the request message comprises a Deregistration Request (DREG-REQ) message; and
    the command message comprises a Deregistration Command (DREG-CMD) message.

6. An apparatus for wireless communications by a mobile station (MS), comprising:
    a processor; and
    memory storing instructions that are executable by the processor to:
        transmit a request message to a base station (BS) to notify the BS of the MS entering the idle mode, wherein the message includes an indication of a first frequency division duplex (FDD) group of the BS,
        receive a command message from the BS, wherein the command message includes an indication of a second FDD group of the BS,
        monitoring paging messages during a time interval of the second FDD group and powering down during a time interval of the first FDD group, and
        receive a paging advertisement message in the second FDD group and sending a reply to the paging advertisement message to the base station in an uplink subframe of the second FDD group.

7. The apparatus of claim 6, wherein the mobile station is capable of full-duplex FDD communication.

8. The apparatus of claim 6, wherein the mobile station is capable of half-duplex FDD communication.

9. The apparatus of claim 6, wherein the command message includes indications of both the first and the second FDD groups.

10. The apparatus of claim 6, wherein:
    the request message comprises a Deregistration Request (DREG-REQ) message; and
    the command message comprises a Deregistration Command (DREG-CMD) message.

11. An apparatus for wireless communications by a mobile station (MS), comprising:
    means for transmitting a request message to a base station (BS) to notify the BS of the MS entering the idle mode, wherein the message includes an indication of a first frequency division duplex (FDD) group of the BS;
    means for receiving a command message from the BS, wherein the command message includes an indication of a second FDD group of the BS;
    means for monitoring paging messages during a time interval of the second FDD group and powering down during a time interval of the first FDD group; and
    means for receiving a paging advertisement message in the second FDD group and sending a reply to the paging advertisement message to the base station in an uplink subframe of the second FDD group.

12. The apparatus of claim 11, wherein the mobile station is capable of full-duplex FDD communication.

13. The apparatus of claim 11, wherein the mobile station is capable of half-duplex FDD communication.

14. The apparatus of claim 11, wherein the command message includes indications of both the first and the second FDD groups.

15. The apparatus of claim 11, wherein:
    the request message comprises a Deregistration Request (DREG-REQ) message; and
    the command message comprises a Deregistration Command (DREG-CMD) message.

16. A computer-program storage apparatus for wireless communication by a mobile station (MS), comprising a memory device having instructions stored thereon, the instructions being executable by one or more processors and the instructions comprising:
    instructions for transmitting a request message to a base station (BS) to notify the BS of the MS entering the idle mode, wherein the message includes an indication of a first frequency division duplex (FDD) group of the BS;
    instructions for receiving a command message from the BS, wherein the command message includes an indication of a second FDD group of the BS;
    instructions for monitoring paging messages during a time interval of the second FDD group and powering down during a time interval of the first FDD group; and instructions for receiving a paging advertisement message in the second FDD group and sending a reply to the paging advertisement message to the base station in an uplink subframe of the second FDD group.

17. The computer-program storage apparatus of claim 16, wherein the mobile station is capable of full-duplex FDD communication.

18. The computer-program storage apparatus of claim 16, wherein the mobile station is capable of half-duplex FDD communication.

19. The computer-program storage apparatus of claim 16, wherein the command message includes indications of both the first and the second FDD groups.

20. The computer-program storage apparatus of claim 16, wherein:
the request message comprises a Deregistration Request (DREG-REQ) message; and
the command message comprises a Deregistration Command (DREG-CMD) message.

21. A method for wireless communications by a base station (BS), comprising:
receiving a request message from a mobile station (MS), wherein the request message includes an indication of a first frequency division duplex (FDD) group of the BS;
transmitting a command message to the MS, wherein the command message includes an indication of a second FDD group of the BS;
broadcasting a paging advertisement message in the second FDD group; and
receiving a reply to the paging advertisement message in an uplink subframe of the second FDD group from the mobile station.

22. The method of claim 21, wherein the command message includes both the first and the second FDD group numbers.

23. The method of claim 21, further comprising:
broadcasting a paging advertisement message in both of the first and second FDD groups if a reply was not received from an MS in the second FDD group; and
receiving a reply to the paging advertisement message in the uplink subframe of one of the FDD groups from the mobile station.

24. The method of claim 21, wherein:
the request message comprises a Deregistration Request (DREG-REQ) message; and
the command message comprises a Deregistration Command (DREG-CMD) message.

25. An apparatus for wireless communications by a base station (BS), comprising:
a processor; and
memory storing instructions that are executable by the processor to:
receive a request message from a mobile station (MS), wherein the request message includes an indication of a first frequency division duplex (FDD) group of the BS,
transmit a command message to the MS, wherein the command message includes an indication of a second FDD group of the BS ,
broadcast a paging advertisement message in the second FDD group, and
receive a reply to the paging advertisement message in an uplink subframe of the second FDD group from the mobile station.

26. The apparatus of claim 25, wherein the command message includes both the first and the second FDD group numbers.

27. The apparatus of claim 25, further comprising:
logic for broadcasting a paging advertisement message in both of the first and second FDD groups if a reply was not received from an MS in the second FDD group; and
logic for receiving a reply to the paging advertisement message in the uplink subframe of one of the FDD groups from the mobile station.

28. The apparatus of claim 25, wherein:
the request message comprises a Deregistration Request (DREG-REQ) message; and
the command message comprises a Deregistration Command (DREG-CMD) message.

29. An apparatus for wireless communications by a base station (BS), comprising:
means for receiving a request message from a mobile station (MS), wherein the request message includes an indication of a first frequency division duplex (FDD) group of the BS;
means for transmitting a command message to the MS, wherein the command message includes an indication of a second FDD group of the BS;
means for broadcasting a paging advertisement message in the second FDD group; and
means for receiving a reply to the paging advertisement message in an uplink subframe of the second FDD group from the mobile station.

30. The apparatus of claim 29, wherein the command message includes both the first and the second FDD group numbers.

31. The apparatus of claim 29, further comprising:
means for broadcasting a paging advertisement message in both of the first and second FDD groups if a reply was not received from an MS in the second FDD group; and
means for receiving a reply to the paging advertisement message in the uplink subframe of one of the FDD groups from the mobile station.

32. The apparatus of claim 29, wherein:
the request message comprises a Deregistration Request (DREG-REQ) message; and
the command message comprises a Deregistration Command (DREG-CMD) message.

33. A computer-program storage apparatus for wireless communication by a base station (BS), comprising a memory device having instructions stored thereon, the instructions being executable by one or more processors and the instructions comprising, comprising:
instructions for receiving a request message from a mobile station (MS), wherein the request message includes an indication of a first frequency division duplex (FDD) group of the BS;
instructions for transmitting a command message to the MS, wherein the command message includes an indication of a second FDD group of the BS;
instructions for broadcasting a paging advertisement message in the second FDD group; and
instructions for receiving a reply to the paging advertisement message in an uplink subframe of the second FDD group from the mobile station.

34. The computer-program storage apparatus of claim 33, wherein the command message includes both the first and the second FDD group numbers.

35. The computer-program storage apparatus of claim 33, further comprising:
broadcasting a paging advertisement message in both of the first and second FDD groups if a reply was not received from an MS in the second FDD group; and receiving a reply to the paging advertisement message in the uplink subframe of one of the FDD groups from the mobile station.

36. The computer-program storage apparatus of claim 33, wherein:
the request message comprises a Deregistration Request (DREG-REQ) message; and
the command message comprises a Deregistration Command (DREG-CMD) message.

* * * * *